Figure 1:
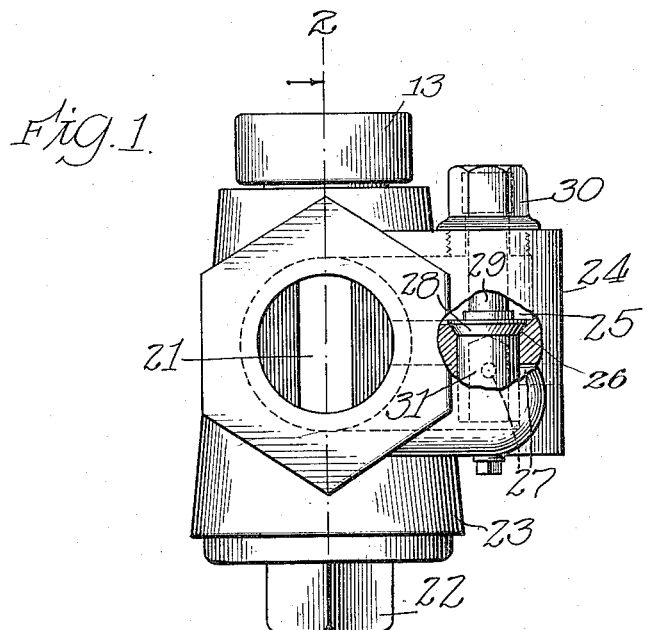

T. R. McKNIGHT.
VALVE.
APPLICATION FILED APR. 2, 1913.

1,160,302.

Patented Nov. 16, 1915.

Witnesses:
G. W. Dumanes Jr.
R. Bauerle

Inventor:
Thomas R. McKnight
by Adams Jackson,
attys.

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

VALVE.

1,160,302.  Specification of Letters Patent.  Patented Nov. 16, 1915.

Original application filed March 17, 1911, Serial No. 615,061. Divided and this application filed April 2, 1913. Serial No. 758,339.

*To all whom it may concern:*

Be it known that I, THOMAS R. McKNIGHT, a citizen of the United States, residing at Aurora, in the county of Kane and State of Illinois, have invented certain new and useful Improvements in Valves, of which the following is a specification, reference being had to the accompanying drawings.

My invention relates to valves, and has for its object to provide a new and improved valve which will be peculiarly adapted for use in connection with air-operated dump cars, such as that shown and described in my pending application for patent, Serial No. 615,061, filed March 17, 1911, of which this is a division, although the improvement which forms the subject-matter of this application may be applied to valves intended for numerous other uses. I accomplish this object as illustrated in the drawings and as hereinafter described. What I regard as new is set forth in the claims.

Figure 2:
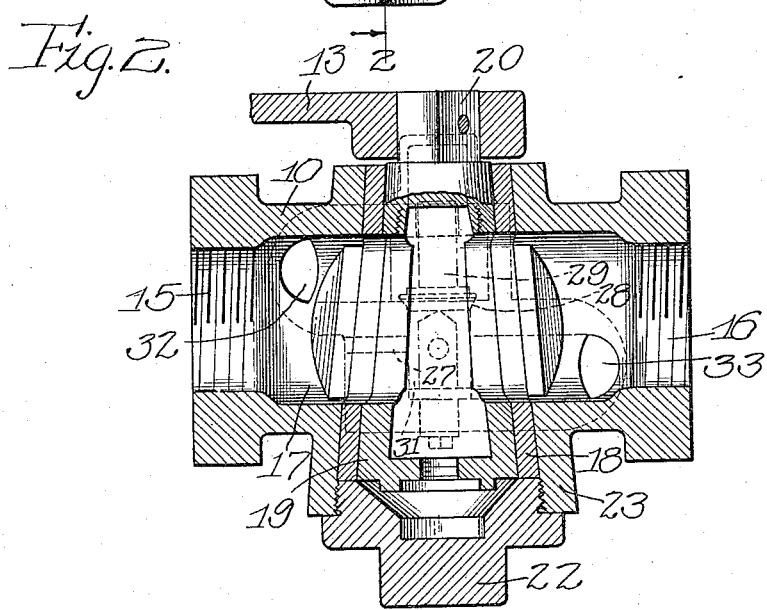

In the accompanying drawings, Figure 1 is an end view of my improved valve; and Fig. 2 is a longitudinal vertical section on line 2—2 of Fig. 1.

Referring to the drawings, 10 indicates the body of the valve.

15 indicates the inlet end thereof, and 16 the outlet end.

17 indicates a passage extending directly through the valve body from the inlet 15 to the outlet 16, forming a main passageway therethrough.

18 indicates a conical bushing, which is fitted centrally in the body of the valve and forms a bearing for a valve-plug 19, which is also tapered and fits in the bushing so as to rotate therein in the ordinary way. At one end the plug 19 is provided with a square projection 20 to receive a lever 13 by which the plug is rotated to open or close the main passage through the valve. As shown in Fig. 1, the plug 19 is provided with a slit 21 which, when the valve is open, registers with the main passageway and when the valve is closed extends transversely thereof. 22 indicates a screw-cap fitted in a projecting portion 23 of the valve body so as to inclose the lower end of the bushing. When access to the plug and bushing are desired, the cap 22 may be removed.

24 indicates a boss or lateral extension of the valve body, which contains a check-valve chamber 25 and a valve-seat 26. The boss 24 also is provided below the valve-seat 26 with one or more exhaust passages 27, as shown in Fig. 1.

28 indicates a check-valve which is fitted in the chamber 25 and is adapted to rest on the seat 26, said check-valve having an upwardly-projecting stem 29 fitted in a suitable bearing in a screw-cap 30 which fits in the upper portion of the boss 24, as shown in Fig. 1, and is also provided with a downwardly-projecting stem or barrel 31 which fits closely in that portion of the check-valve chamber 25 below the seat 26,—the arrangement being such that when the check-valve 28 is on its seat the barrel 31 closely fits in the lower portion of the check-valve chamber 25 and closes the ports 27. The length of the barrel 31 is such that it does not extend to the bottom of the check-valve chamber 25, a space being left which serves to admit air from the outlet end 16 of the valve 10, as hereinafter described.

32 indicates a by-pass which leads from the inlet end of the valve 10 to the upper portion of the check-valve chamber 25, and 33 indicates a by-pass which leads from the outlet end of the valve 10 to the lower portion of the check-valve chamber 25, as shown in Fig. 2, so as to admit air to the lower portion of said check-valve chamber below the barrel 31 of the check-valve 28. The purpose of this arrangement is to permit the check valve 28 to be raised by back pressure under certain conditions, so as to carry the barrel 31 up above the ports 27 and permit the air to exhaust through said ports, as hereinafter described. It will be noted that the valve chamber 25 and the by-passes 32 and 33 together provide a by-pass which extends around the valve plug 19 and connects the two end portions of the valve casing, the exhaust ports 27 opening into this by-pass. When the valve 28 is seated this by-pass and also the exhaust ports 27 are closed.

The operation is as follows: When the valve plug 19 is open and air or other fluid under pressure is admitted to the valve, the air exerts downward pressure on the check-valve 28 through by-pass 32, tending to hold said valve closely down upon its seat, while at the same time air under the same pressure is admitted to the lower portion of the check-valve chamber 25 through by-pass 33, and such pressure tends to lift the barrel 31, but as such barrel is of less diameter than the check-valve, the downward pressure upon the check-valve is greater and the valve is not lifted from its seat. When the check-valve 28 is on its seat the barrel 31 serves to close the exhaust ports 27 so that the escape of air through said ports is at that time prevented. When the valve-plug 19 is turned to its closed position by hand or by suitable mechanism, such, for example, as that described in my said application, and the pressure at the inlet side is released the check-valve 28 is relieved from downward pressure, but air is still admitted under back pressure to the check-valve chamber 25, and operates to lift said check-valve and expose the outlet ports 27, thereby permitting air to escape into the atmosphere.

While my improved valve is intended primarily for use in connection with dump cars, it may be used for any other purpose for which it is adapted.

That which I claim as my invention, and desire to secure by Letters Patent, is,—

1. A valve having a main passageway, a member for permitting or preventing the flow of fluid through said passageway, a fluid-pressure-operated valve member, an exhaust port closed by said valve member when the latter is in operative position, and means whereby when said main passageway is closed and the pressure at one side thereof is reduced said valve member will be actuated by back-pressure to open said exhaust port.

2. A valve having a main passageway, a member for permitting or preventing the flow of fluid through said passageway, a valve member, an exhaust port closed by said valve member when the latter is in operative position, and passages through which fluid pressure is applied to said valve member to hold the same in operative position when said main passageway is open and to move said valve member out of operative position by back-pressure to open the exhaust port when said main passageway is closed and the pressure at one side thereof is reduced.

3. A valve having a main passageway, means for permitting or preventing the flow of fluid through said main passageway, a check-valve chamber, a by-pass connecting said check-valve chamber with one end of said main passageway, an exhaust port, a by-pass connecting said valve chamber with the other end of said main passageway, and a check-valve in said check-valve chamber and operated by fluid pressure to normally close said exhaust port when the main passageway is open, said check valve being operated by back-pressure to open said exhaust port when said main passageway is closed and the pressure at one side thereof is reduced.

4. A valve having a main passageway, a valve for controlling the flow of fluid in either direction through said passageway, a check-valve chamber communicating with said passageway at one side of said valve, an exhaust-port communicating with said passageway at the opposite side of said valve, a check-valve adapted to be seated in said check-valve chamber to close said exhaust-port, said check-valve having a greater exposed area at one side of its seat than at the other.

5. A valve having a main passageway, a valve for controlling the flow of fluid in either direction through said passageway, a check-valve chamber, a by-pass connecting said check-valve chamber with one end portion of said passageway, an exhaust-port, a by-pass adapted to connect said exhaust-port with the other end portion of said passageway, and a check-valve in said check-valve chamber and acting normally to close said exhaust-port, said check-valve having a greater exposed area at one side of its seat than at the other and being exposed to back-pressure through the latter by-pass.

6. A valve, comprising a body having a main passageway and a by-pass connecting the end portions thereof, a member for opening or closing said main passageway to control the flow of fluid in either direction therethrough, an exhaust port communicating with said by-pass, and a valve operated by the variation of the pressure in portions of said by-pass at opposite sides of said valve for opening or closing said exhaust port.

7. A valve, comprising a body having a main passageway and a by-pass connecting the end portions thereof, a member for opening or closing said main passageway to control the flow of fluid in either direction therethrough, an exhaust port communicating with said by-pass, and a valve for opening or closing said exhaust port, said valve acting to close said exhaust port when the pressure at both sides of said member is equal, and to open said exhaust port when the pressure at a certain side of said member is greater than the pressure at the other side thereof.

8. A valve, comprising a body having a main passageway, a member for opening and closing said passageway to control the flow of fluid in either direction therethrough, a valve chamber connected by by-passes with said passageway at opposite sides of said member, an exhaust port opening into said valve chamber, and a valve in said valve chamber operated by the variation of the pressure in portions of said by-pass at opposite sides of said valve for opening or closing said exhaust port.

9. A valve, comprising a body having a main passageway, a member for opening and closing said passageway to control the flow of fluid in either direction therethrough, a valve chamber connected by by-passes with said passageway at opposite sides of said member, an exhaust port, opening into said valve chamber, and a valve in said valve chamber for opening or closing said exhaust port, said valve acting normally to close said exhaust port when the pressure at both sides of said member is equal.

10. A valve, comprising a body having a main passageway, a member for opening and closing said passageway to control the flow of fluid in either direction therethrough, a valve chamber connected by by-passes with said passageway at opposite sides of said member, an exhaust port opening into said valve chamber, and a fluid-pressure operated valve in said valve chamber for opening or closing said exhaust port, said valve having a greater effective area at one side of its seat than at the other, whereby variation in the relative pressure at opposite sides of said member operates said valve to open or close the exhaust port, and to open said exhaust port when back-pressure predominates.

THOMAS R. McKNIGHT.

Witnesses:
H. O. KILLIAN,
W. S. ENDERICH.

Copies of this patent may be obtained for five cents each, by addressing the "Commissioner of Patents, Washington, D. C."